United States Patent [19]
Feddeler et al.

[11] Patent Number: 6,145,104
[45] Date of Patent: *Nov. 7, 2000

[54] DATA PROCESSING SYSTEM EXTERNAL PIN CONNECTIVITY TO COMPLEX FUNCTIONS

[75] Inventors: James R. Feddeler, Austin, Tex.;
William Edward Getka, Harvard, Ill.;
Michael Charles Wood, Pflugerville;
Daniel Mark Thompson, Austin, both of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/022,396

[22] Filed: Feb. 12, 1998

[51] Int. Cl.[7] .................................................. G01R 31/28
[52] U.S. Cl. ........................... 714/724; 714/30; 714/733; 714/734
[58] Field of Search .................................... 714/724, 733, 714/734, 30

[56] References Cited

U.S. PATENT DOCUMENTS

| | | | |
|---|---|---|---|
| 5,005,173 | 4/1991 | Martin | 371/22.6 |
| 5,012,180 | 4/1991 | Dalrymple et al. | 324/73.1 |
| 5,214,655 | 5/1993 | Eichelberger et al. | 371/22.5 |
| 5,231,312 | 7/1993 | Gongwer et al. | 307/465 |
| 5,289,034 | 2/1994 | Hundt | 257/678 |
| 5,450,418 | 9/1995 | Ganapathy | 371/24 |
| 5,519,713 | 5/1996 | Baeg et al. | 371/22.1 |
| 5,561,614 | 10/1996 | Revilla et al. | 364/579 |
| 5,581,698 | 12/1996 | Miwa et al. | 395/183.18 |
| 6,028,439 | 10/1998 | Swoboda | 395/183.01 |

*Primary Examiner*—Albert DeCady
*Assistant Examiner*—Samuel Lin

[57] ABSTRACT

An integrated circuit containing a data processing system with a number of external peripheral pins utilizes the peripheral pins for both testing the corresponding peripherals and for parallel testing of other complex functions in a MCU. The MCU has a plurality of test modes that can be selected, with different peripheral pins being connected to a test circuit depending on which test mode is selected. This allows testing of peripherals via their corresponding pins, as well as other complex functions without the necessity of having dedicated test pins.

24 Claims, 3 Drawing Sheets

|  | 51 | | | | 52 | | 53 | | | 54 | |
| --- | --- | --- | --- | --- | --- | --- | --- | --- | --- | --- | --- |
|  | P11 | P10 | P9 | P8 | P7 | P6 | P5 | P4 | P3 | P2 | P1 | P0 |
| MODE 61 { M8 | S11 | S10 | S9 | S8 | T7 | T6 | T5 | T4 | T3 | T2 | T1 | T0 |
| M7 | T7 | S10 | S9 | S8 | S7 | T6 | T5 | T4 | T3 | T2 | T1 | T0 |
| MODE 62 { M6 | T7 | T6 | S9 | S8 | S7 | S6 | T5 | T4 | T3 | T2 | T1 | T0 |
| M5 | T7 | T6 | T5 | S8 | S7 | S6 | S5 | T4 | T3 | T2 | T1 | T0 |
| M4 | *T7* | *T6* | *T5* | *T4* | *S7* | *S6* | *S5* | *S4* | *T3* | *T2* | *T1* | *T0* |
| MODE 63 { M3 | *T7* | *T6* | *T5* | *T4* | *T3* | *S6* | *S5* | *S4* | *S3* | *T2* | *T1* | *T0* |
| M2 | *T7* | *T6* | *T5* | *T4* | *T3* | *T2* | *S5* | *S4* | *S3* | *S2* | *T1* | *T0* |
| M1 | *T7* | *T6* | *T5* | *T4* | *T3* | *T2* | *T1* | *S4* | *S3* | *S2* | *S1* | *T0* |
| MODE 64 { M0 | T7 | T6 | T5 | T4 | T3 | T2 | T1 | T0 | S3 | S2 | S1 | S0 |

DATA PROCESSING SYSTEM EXTERNAL
PIN CONNECTIVITY TO COMPLEX
FUNCTIONS

FIELD OF THE INVENTION

The present invention generally relates to data processing systems, and more specifically to providing external pins for testing complex functions in a semiconductor device containing a data processing system.

BACKGROUND OF THE INVENTION

Test modes in a microcontroller unit (MCU) provide controllability and observability of otherwise inaccessible address and data used by the MCU. Data and control information can be loaded and read from an MCU either serially or in parallel. Serial processing requires a minimum number of pins, but is quite slow. For example, it typically takes eight to ten clock cycles per byte when done serially.

Since test time has a material impact on the cost of an integrated circuit, these eight-to-ten cycles used for serial loading and reading of data and control information can be quite costly. A traditional solution has been to load and read data, address, and control information in parallel. Optimally, a sufficient number of pins to externalize the address bus, the data bus, and control information is used. For example, this may require 16 address pins, 8 data pins, and several control pins to control reading, writing, and other control functions. This solution has a serious disadvantage in that it significantly increases the number of pins utilized for the integrated circuit. Reducing pin count reduces packaging size and therefore packaging costs.

FIG. 1 is a block diagram illustrating a typical microcontroller unit (MCU) 20 as known in the prior art. The MCU 20 has a central processing unit (CPU) 22, memory 24, direct memory access unit (DMA) 26 communicating on a bi-directional internal bus 28. Also coupled to the bi-directional internal bus 28 are peripheral 32, peripheral 34, and peripheral 36. Peripheral 32 communicates external to the MCU 20 on pins 33. Peripheral 36 communicates on pin 37. Also coupled to the internal bus 28 is a test port 38 which communicates on test pins 39. In this example, peripheral 32 is shown connected to external pins 33, peripheral 36 is shown connected to peripheral pin 37 and test port 38 is shown connected to external test port pins 39. Examples of peripheral modules 32, 34, 36 are timers, serial peripheral interfaces (SPI), synchronous communications interfaces (SCI), A/D converters, PLLs, keyboards, and other auxiliary devices. The term peripheral here includes modules that are connected to external pins, and those, such as PLLs, that are not. Indeed, the term peripheral here should be taken to include any functional blocks included in an MCU 20 other than CPU 22 memory 24, DMA 26, or test ports 38. The CPU 22 and DMA 26 can be treated as peripherals for purposes of testing and hereinbelow. Typically, the CPU 22, the DMA 26, and potentially the test port 38 are bus masters of the bi-directional internal bus 28 whereas the memory 24, and the peripherals 32, 34, 36 are bus slaves. Typically, pins used for testing 39 cannot also be used for peripherals 33, 37.

One prior art solution to reducing pin count while maintaining parallel loading and reading of test information is a time multiplexing of address, data, and control information on a smaller number of pins. Indeed, a logical extension of this time multiplexing is a serial loading where everything is time multiplexed over a single serial port. This approach is a compromise approach and still has the problem of requiring at a minimum approximately eight pins. There is a trade-off of the number of pins used against test speed, with serial loading and reading at one end of the tradeoff and full parallel loading and reading at the other end of the tradeoff.

Referring back to FIG. 1, it should be noted that peripheral 32 is shown with four dedicated external pins 33 and peripheral 36 is shown with one external pin 37. As the number of peripherals 32, 34, 36 increases, as a result of larger and larger scale integration, the number of pins 33, 37 dedicated to peripherals 32, 36, increases accordingly. The number of pins 39 that can be thus dedicated to testing on a test port 38 correspondingly decreases in order to maintain low pin-count packages.

Another prior art solution is to utilize peripheral pins 33, 37 as test pins 39. One major problem with this solution is the loss of the ability to test the peripheral 32, 36 via its pins 33, 37 in test mode. This introduces serious reliability and verifiability problems.

It would thus be advantageous to be able to provide for parallel loading and reading of the MCU 20 in test mode, while maintaining the ability to test peripherals 32, 36 via their peripheral pins 33, 37, in a minimum pin-count integrated circuit.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

An integrated circuit containing a data processing system with a number of external peripheral pins 33, 37 utilizes the peripheral pins 33, 37 for both testing the corresponding peripherals 32, 36 and for parallel testing of other complex functions in a MCU 20. The MCU 20 has a plurality of test modes that can be selected, with different peripheral pins 33, 37 being connected to a test circuit depending on which test mode is selected. This allows testing of peripherals 32, 36 via their corresponding pins 33, 37, as well as other complex functions without the necessity of having dedicated test pins.

Figure 1:
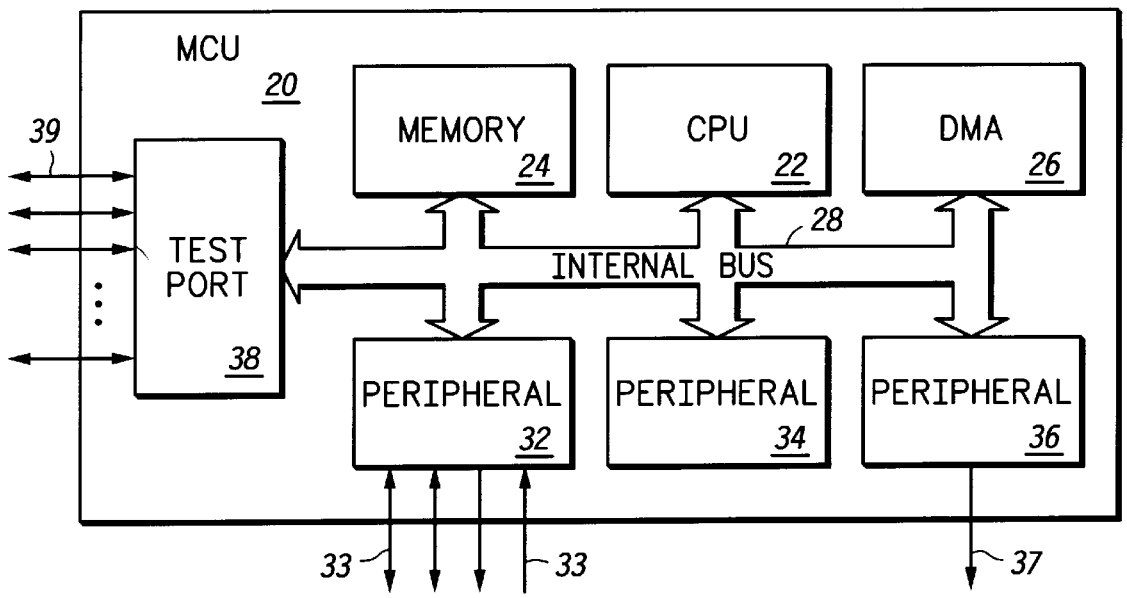
FIG. 1 is a block diagram illustrating a typical microcontroller unit (MCU) as known in the prior art.
Figure 2:
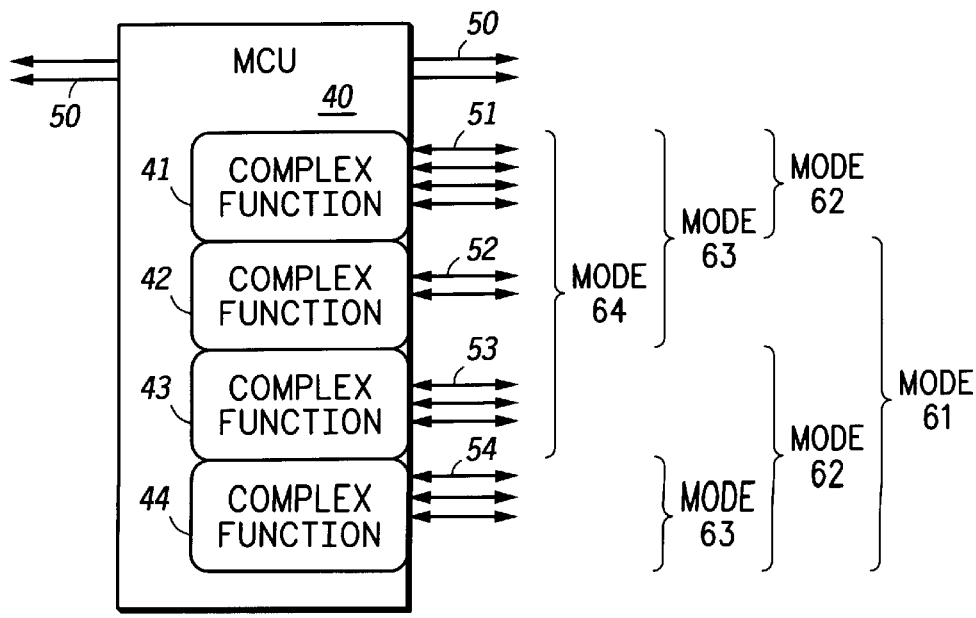
FIG. 2 is a block diagram illustrating movable functions, in accordance with the present invention.

FIG. 2 is a block diagram illustrating movable functions. MCU 40 contains complex functions 41, 42, 43, 44. These complex functions correspond to peripherals 32, 34, 36, as well as CPU 22 and DMA 26 in FIG. 1. Complex function 41 has external pins 51, complex function 42 has external pins 52, complex function 43 has external pins 53, and complex function 44 has external pins 54. There are typically additional external pins 50 that are not connected to a complex function, such as power, ground, and reset. Four test modes 61-64 are shown in FIG. 2. A test mode 64 utilizes pins 51, 52, and 53 for parallel testing. Note that this test mode 64 allows complex function 44 to be tested using pins 54. A test mode 63 utilizes pins 51, 52, and 54 for parallel testing, allowing complex functions 43 to be tested via pins 53. A test mode 62 utilizes pins 51, 53, and 54 for parallel testing, allowing complex functions 42 to be tested via pins 52. A test mode 61 utilizes pins 52, 53, and 54 for parallel testing, allowing complex functions 41 to be tested via pins 51. In the preferred embodiment, test mode is entered when coming out of reset with a particular external pin asserted with an over-voltage. When thus coming out of reset, with the particular pin asserted with an over-voltage, a plurality of the other external pins are latched to designate which test mode 61, 62, 63, 64 is selected. In the preferred embodiment, four pins are used to identify sixteen ($2^4$) possible test modes.

Figure 3:
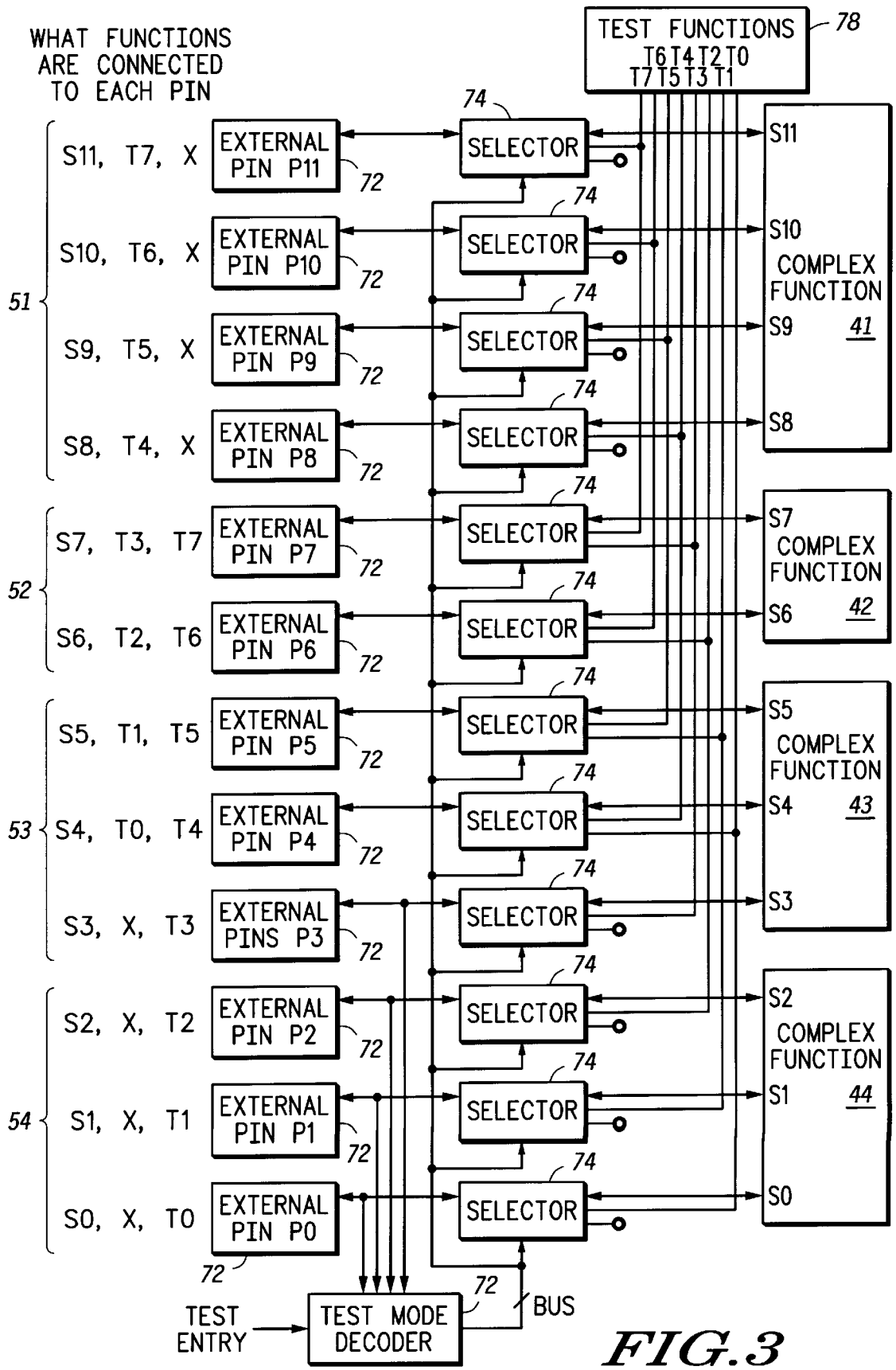
FIG. 3 is a block diagram illustrating the connectivity of the embodiment shown in FIG. 2.

FIG. 3 is a block diagram illustrating the connectivity of the embodiment shown in FIG. 2. Twelve external pins 72 numbered from P0 through P11 are grouped in four groups 51, 52, 53, 54. These are the same sets or groups of pins shown in FIG. 2. Pin set 51 contains external pins P8 through P11. Pin set 52 contains external pins P6 through P7. Pin set 53 contains external pins P3 through P5. Finally, pin set 54 contains external pins P0 through P2. Each of the external pins 72 is bidirectionally coupled to a corresponding selector 74. Each selector 74 can be a bidirectional MUX, or some other selector means that selects and routes the corresponding external pins 72 to one of three sources/destinations. In the preferred embodiment, the selectors corresponding to the first 51 and last 54 sets or groups of pins are only connected to two sources/destinations. However, in an alternate embodiment, the sources/destinations of these selectors can be overlapped, resulting in three sources/destinations for each corresponding selector 74.

The selectors 74 are controlled by a plurality of selector signals generated by a test mode decoder 76. As noted earlier, the test mode decoder 76 will generate a set of test mode signals depending on the status of a set of external pins upon reset. Shown in FIG. 3, external pins P0 through P3 are received by the test mode decoder 76 and utilized when entering test mode to identify one of sixteen possible test modes, and as a result to generate the test mode signals. Each of the twelve selectors 74 is coupled via one of its source/destination connections to one of the complex functions 41, 42, 43, 44 and via one or both of the remaining two source/destination connections to a test function circuit 78. The selector 74 connected to external pin P11 in pin set 51 is connected to contact S11 of complex function 41. The selectors 74 connected to external pins P10–P8 in pin set 51 are connected to corresponding contacts S10–S8 of complex function 41. Similarly the selectors 74 connected to external pins P7–P6 in pin set 52 are connected to corresponding contacts S7–S6 of complex function 42. The selectors 74 connected to external pins P5–P3 in pin set 53 are connected to corresponding contacts S5–S3 of complex function 43. Finally, the selectors 74 connected to external pins P2–P0 in pin set 54 are connected to corresponding contacts S2–S0 of complex function 44.

Each of the selectors 74 is also bidirectionally coupled to one or more test functions 78. Test functions are numbered from T0 through T7. In the preferred embodiment, these eight connections are used to multiplex address and data on the bidirectional internal bus 28. The selector 74 connected to external pin P11 is coupled to test function T7. The selector 74 connected to external pin P10 is coupled to test function T6. The selector 74 connected to external pin P9 is coupled to test function T5. The selector 74 connected to external pin P8 is coupled to test function T4. The selector 74 connected to external pin P7 is coupled to test functions T3 and T7. The selector 74 connected to external pin P6 is coupled to test functions T2 and T6. The selector 74 connected to external pin P5 is coupled to test functions T1 and T5. The selector 74 connected to external pin P4 is coupled to test functions T0 and T4. The selector 74 connected to external pin P3 is coupled to test function T3. The selector 74 connected to external pin P2 is coupled to test function T2. The selector 74 connected to external pin PI is coupled to test function T1. The selector 74 connected to external pin P0 is coupled to test function T0. Test function 78 may be address bus, data bus, scan input, read-write inputs, clocks or a myriad of other control signals. Note, they can also be multiplexed test functions. In particular, in the preferred embodiment, address and data bus are time division multiplexed three cycles. In read mode, the multiplexing is address high byte, address lower byte, data byte. In write mode, the multiplexing is address bus high, data, and address bus low order.

Figures 4, 5:
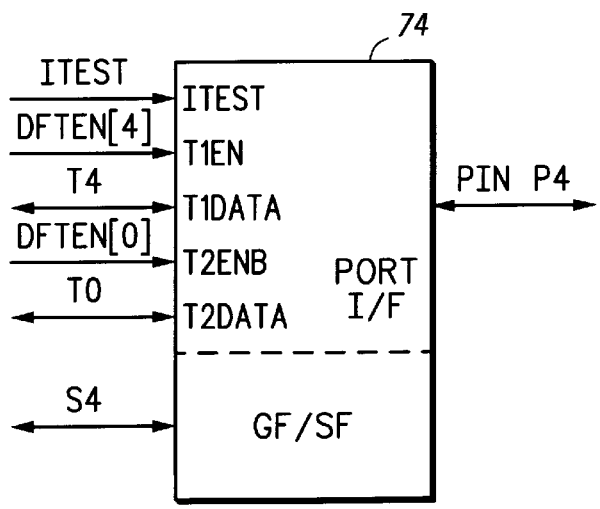
FIG. 4 is a table graphically illustrating the connectivity in FIG. 3.
FIG. 5 illustrates a selector coupled to external pin P4 for the embodiment shown in FIG. 3.

FIG. 4 is a table graphically illustrating the connectivity in FIG. 3. On the X axis across the top of the table are the twelve pins numbered from P11 through P0. They are grouped as before, with pin group 51 containing pins P8 through P11, pin group 52 containing pins P6 and P7, pin group 53 containing pins P3 through P5, and pin group 54 containing pins P0 through P2. On the X axis are nine mode bits numbered M0 through M8. Mode 61 corresponds to mode M8. Mode 62 corresponds to modes M4 through M6. Mode 63 corresponds to modes M2 and M3. Mode 64 corresponds to mode M0. Thus, either mode M2 or M3 may be selected to implement mode 63. Likewise, one of the modes M4 through M6 may be selected to implement mode 62. The elements in the table in FIG. 4 are either prefixed by an S or a T. The elements prefixed by an S indicate a connection to a complex function 41, 42, 43, 44. The elements prefixed by a T indicate a connection to a test function 78. The top mode M8 numbers the elements left to right 11 through 0. The first four columns containing S11 through S8 indicate connections to contacts S8 through S11 in complex function 41. The remaining elements in the M8 mode row are prefixed with a "T" to indicate connections to test function 78. The remainder of the table is formed by placing an S on each element down a diagonal descending to the right starting at the S11 entry in the top left corner. All entries below that are prefixed with a "T" to indicate connections to test function 78. There is thus a moving band of four complex function 41, 42, 43, 44 connectors S0–S11 moving down diagonally through the table. All entries above and below the diagonal band of complex function connections are connections to the test functions 78.

Table T-1 illustrates Verilog Code that sets an array of test mode enable pins generated by the test mode controller 76. The full test mode pin enable (DFTEN[7:0]) is defined as an eight wire bus. The first element in the DFTEN array (DFTEN[0]) is asserted when test mode (TSTMODE) is greater than 0. Wire DFTEN[1] is asserted when test mode is greater than 1. This continues through DFTEN[7] being asserted when test mode is greater than 7. These correspond to the nine test modes M0 through M8 shown in FIG. 4. Note that the number of test modes in the present invention may be greater than or less than the nine test modes shown in the example.

TABLE T-1

```
module MDEC_NOADX( TSTMODE, DFTEN );
    input [3:0] TSTMODE;      // Test mode number latched
    input [7:0] DFTEN;        // Default test mode pin enable
    wire [7:0] DFTEN;
    assign DFTEN[0] = TSTMODE>0;
    assign DFTEN[1] = TSTMODE>1;
    assign DFTEN[2] = TSTMODE>2;
    assign DFTEN[3] = TSTMODE>3;
    assign DFTEN[4] = TSTMODE>4;
    assign DFTEN[5] = TSTMODE>5;
    assign DFTEN[6] = TSTMODE>6;
    assign DFTEN[7] = TSTMODE>7;
endmodule
```

FIG. 5 illustrates a selector 74 coupled to external pin P4. It corresponds to the column in FIG. 4 labeled P4. It is a sample selector 74 that can be implemented identically for each of the twelve external pins 72 number P0–P11. The selector 74 has three control inputs generated by the test mode decoder 76, one external pin (PORT), and three internal connections (GF/SF, T2DATA, T1DATA). The first control input (ITEST) is asserted when in test mode. The second control input (T1EN) is coupled to the DFTEN[4] wire described in Table T-1. This wire will be asserted when test mode is greater than 4. A second test enable signal (T2ENB) is connected to the DFTEN[0] wire which is asserted when test mode is greater than 0. The PORT connection is connected to external pin P4. The GF/SF connection is connected to contact S4 in complex function 43. The T1DATA connection is connected to the T4 test function. The T2DATA connection is connected to the T0 test function. Pin P4 is thus routed via its selector 74 to either S4, T0, or T4, depending on the status of signals ITEST, DFTEN[0], and DFTEN[4].

Table T-2 is a table illustrating the connectivity between external pin P4 and S4, T0, and T4. When ITEST is not asserted, S4 is selected. When ITEST is asserted and both DFTEN[4] and DFTEN[0] are 0, T0 is selected. When ITEST is 1, DFTEN[4] is 0, and DFTEN[0] is 1, S4 is again selected. When ITEST is 1, DFTEN[4] is 1, and DFTEN[0] is 0, the selector output is undefined. This is because the definition of DFTEN[0] and DFTEN[4] as shown in Table T-1 would not allow this combination. Finally, when all three signal, ITEST, DFTEN[4], and DFTEN[0] are all 1, test function T4 is selected.

TABLE T-2

| ITEST | DFTEN[4] | DFTEN[0] | Output |
|-------|----------|----------|--------|
| 0     | X        | X        | S4     |
| 1     | 0        | 0        | T0     |
| 1     | 0        | 1        | S4     |
| 1     | 1        | 0        | ???    |
| 1     | 1        | 1        | T4     |

Test pin movability based on test mode insures that all pins can be used for special functions and all special functions can be tested in a factory test environment. Special functions include I/O for UARTs, SPIs, SCIs, and timers. One advantage of this implementation is that no single pin is used for more than two test functions and one special function and no test function is mapped to more than two pins. This greatly reduces the amount of hardware, and therefore costs, required to implement the movability. This also minimizes test resources and the amount of pattern regeneration required. The only requirement is that each special function to be tested is tested in a single mode for full testability of that module. This means that the total number of pins required is equal to the number of pins required for test plus the largest number of pins used by any special function. Thus, with twelve total pins, with eight pins needed for test, the largest special function that can be tested is one requiring four pins.

Allowing test pins to be remapped from one physical set of pins to another, peripherals 32, 34, 36 which are multiplexed with test pins can be tested by moving the test function to other pins while that function is being tested. In best case, a microcontroller (MCU) 20 has no pins dedicated to test functions alone.

Advantages of such a methodology include: significantly better utilization of pins; lower cost testing; and the ability to package a product in a lower pin count package. This latter advantage can significantly reduce package costs and printed circuit board area usage.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A semiconductor device comprising:

a plurality of complex function modules;

a plurality of functional testing modules; and a plurality of externally accessible pins, each of the plurality of externally accessible pins connectable to at least one of the plurality of complex function modules and at least one of the plurality of functional testing modules;

wherein each of the plurality of functional testing modules is accessible via the plurality of externally accessible pins during each of a plurality of first operating modes and inaccessible via the plurality of externally accessible pins during a second operating mode and at least one of the plurality of externally accessible pins is connected to a first of the plurality of functional testing modules in a first of the plurality of first operating modes and is connected to a second of the plurality of functional testing modules in a second of the plurality of first operating modes.

2. The semiconductor device of claim 1, wherein at least one of the plurality of functional testing modules substantially tests functions of at least one of the complex function modules.

3. The semiconductor device of claim 1, wherein the plurality of complex function modules are tested by at least one of the plurality of functional testing modules.

4. The semiconductor device of claim 1, further comprising at least one internal function module responsive to at least one of the plurality of functional testing modules.

5. The semiconductor device of claim 1, wherein:
a first of the plurality of externally accessible pins is connected to a first of the plurality of functional testing modules and a second of the plurality of externally accessible pins is connected to a first of the plurality of complex function modules in at least one of the plurality of first operating modes.

6. The semiconductor device of claim 5, wherein:
a third of the plurality of externally accessible pins is connected to a second of the plurality of functional testing modules.

7. The semiconductor device of claim 5, wherein:
a third of the plurality of externally accessible pins is connected to a second of the plurality of complex function modules.

8. The semiconductor device of claim 1, further comprising:
a package, the package including the plurality of complex function modules and the plurality of functional testing modules.

9. The semiconductor device of claim 8, wherein:
at least a portion of each of the plurality of externally accessible pins extends outside of the package.

10. The semiconductor device of claim 1, wherein:
at least one of the plurality of complex function modules is selected from the group consisting of a timer, a serial communication interface, a serial port interface, a general purpose interface bus, and an analog to digital converter.

11. The semiconductor device of claim 1, further comprising:
a plurality of selectors, each of the plurality of selectors responsive to at least one of the plurality of externally accessible pins.

12. The semiconductor device of claim 1, wherein:
the plurality of first operating modes are test modes.

13. The semiconductor device of claim 1, wherein:
the second operating mode is a user mode.

14. The semiconductor device of claim 1, wherein:
the plurality of externally accessible pins is limited to a total less than forty five pins.

15. The semiconductor device of claim 1, wherein:
the plurality of externally accessible pins is limited to total less than twenty pins.

16. The semiconductor device of claim 1, further comprising:
a test mode decoder responsive to at least two of the plurality of externally accessible pins.

17. The semiconductor device of claim 1, wherein:
the at least one of the plurality of externally accessible pins is connected to at least one of the plurality of functional testing modules in a first test mode and is connected to at least one of the plurality of complex function modules in a second test mode.

18. The semiconductor device of claim 17, wherein:
the at least one of the plurality of externally accessible pins is connected to one of the first of the plurality of functional testing modules, the second of the plurality of functional testing modules, and one of the complex function modules, in response to a test mode input.

19. The semiconductor device of claim 1, further comprising:
a selector responsive to at least one of the plurality of externally accessible pins, the selector comprising:
a digital routing device having a control input,
a complex function interface, and
a test function interface.

20. A method of using a semiconductor device, the method comprising the steps of:
connecting at least one of a plurality of externally accessible pins to at least one of a plurality of complex function modules;
accessing each of a plurality of functional testing modules via the plurality of externally accessible pins during each of a plurality of first operating modes, the plurality of functional testing modules inaccessible via the plurality of externally accessible pins during a second operating mode; and
connecting at least one of the plurality of externally accessible pins to a first of the plurality of functional testing modules in a first of the plurality of first operating modes and connecting the at least one of the plurality of externally accessible pins to a second of the plurality of functional testing modules in a second of the plurality of first operating modes.

21. The method of claim 20, further comprising the steps of:
testing the plurality of complex function modules using at least one of the plurality of functional testing modules; and
connecting a first of the plurality of externally accessible pins to a first of the plurality of functional testing modules at a first time and at least one of the plurality of complex function modules at a second time.

22. The method of claim 21, further comprising the step of
connecting a second of the plurality of externally accessible pins to a first of the plurality of complex function modules.

23. The method of claim 22, wherein the step of accessing the plurality of functional testing modules includes the step of:
accessing the plurality of functional testing modules via the plurality of externally accessible pins during each of the plurality of first operating modes, each of the plurality of first operating modes comprising a test mode, the plurality of functional testing modules inaccessible via the plurality of externally accessible pins during the second operating mode, the second operating mode comprising a user mode.

24. A semiconductor device comprising:
a plurality of complex function modules;
a plurality of functional testing modules, at least one of the plurality of functional testing modules substantially tests functions of at least one of the complex function modules;

the plurality of complex function modules are tested by at least one of the plurality of functional testing modules;

a plurality of externally accessible pins, each of the plurality of externally accessible pins connectable to at least one of the plurality of complex function modules and at least one of the plurality of testing function modules; and a package, the package including the plurality of complex function modules and the plurality of functional testing modules;

wherein each of the plurality of functional testing modules is accessible via the plurality of externally accessible pins during each of a plurality of test operating modes and inaccessible via the plurality of externally accessible pins during a user operating mode and at least one of the plurality of externally accessible pins is connected to a first of the plurality of functional testing modules in a first test mode and is connected to a second of the plurality of functional testing modules in a second test mode, and, for at least two of the plurality of test modes, a first of the plurality of externally accessible pins is connected to a first of the plurality of functional testing modules and a second of the plurality of externally accessible pins is connected to a first of the plurality of complex function modules, while a third of the plurality of externally accessible pins is connected to one of a second of the plurality of functional testing modules in a first of the at least two test modes and is connected to a second of the plurality of complex function modules in a second of the at least two test modes.

* * * * *